United States Patent [19]

Carlson, Jr. et al.

[11] 4,380,431
[45] Apr. 19, 1983

[54] TECHNIQUE FOR ELEVATING THE TEMPERATURE OF A FLUID

[75] Inventors: Roy C. Carlson, Jr., Boxford Township, Essex County, Mass.; Edward J. March, Lower Makefield Township, Bucks County, Pa.

[73] Assignee: Western Electric Company, Inc., New York, N.Y.

[21] Appl. No.: 278,152

[22] Filed: Jun. 29, 1981

[51] Int. Cl.³ ............................ F26B 3/00; F22D 1/28
[52] U.S. Cl. ...................................... 432/29; 122/441; 219/326
[58] Field of Search ................ 432/29, 210; 122/441; 219/304, 305, 326

[56] References Cited

U.S. PATENT DOCUMENTS

| Re. 30,399 | 9/1980 | Ammann et al. | 228/180 R |
|---|---|---|---|
| 1,954,929 | 4/1934 | Green | 219/326 |
| 4,090,843 | 5/1978 | Chu et al. | 432/210 |
| 4,187,974 | 2/1980 | Mahajan | 228/242 |

Primary Examiner—John J. Camby
Attorney, Agent, or Firm—D. J. Kirk

[57] ABSTRACT

A technique for elevating the temperature of a heat transfer liquid is disclosed. The liquid, at a low temperature (e.g., 70° F.), is directed through a coil (72) located in the upper portion of an enclosed chamber (71). Condensing, hot vapor on the coils (72) heats the liquid (e.g., 200° F.) passing therethrough. The heated liquid from the coil (72) passes, via a conduit (73) into a reservoir in the lower portion of the chamber (71) where immersion heaters (76-76) heat the liquid (e.g., 400° F.) to the desired temperature. The heated liquid is then discharged from the chamber (71) via an outlet pipe (74). Advantageously, the vapor from the heated liquid in the reservoir is the same vapor which condenses on the coils (72).

2 Claims, 3 Drawing Figures

TECHNIQUE FOR ELEVATING THE TEMPERATURE OF A FLUID

TECHNICAL FIELD

The instant invention is related to an efficient heating apparatus for elevating the temperature of a liquid.

BACKGROUND OF THE INVENTION

In the prior art it is well known to solder, fuse or braze articles by condensing hot saturated vapor of a heat transfer liquid thereon. Typically such operations are performed in a chamber having a reservoir of the heat transfer liquid therein. Immersion heating coils in the reservoir are activated to boil the liquid while cooling coils mounted in the upper portion of the chamber are used to condense vapor from the boiling liquid to form a body of hot saturated vapor and substantially preclude the escape of the vapor from the chamber. The articles are then immersed in the body of vapor which condenses thereon and gives up its latent heat of vaporization thereto to heat the articles to the temperature required for soldering, brazing or fusing. Such a technique is described in U.S. Pat. No. Re. 30,399 which issued on Sept. 9, 1980 and is assigned to Western Electric Company and Bell Telephone Laboratories, Inc. and which is incorporated by reference herein.

This technique has proven to be eminently successful, however, solder flux placed on the article to be soldered is washed therefrom by the liquid condensate and falls into the reservoir of the boiling heat transfer liquid. The flux and other contaminants coming in contact with the immersion heaters can cause "hot spots" on the heaters which can lead to thermal degradation of the heat transfer fluid.

To overcome these problems the heat transfer liquid-flux mixture dripping from the article being soldered is intercepted by a pan and redirected outside the facility to a filtration system described in copending U.S. patent application No. 278,151 titled "Rosin Flux Filtration System" by E. J. March and G. M. Wenger, filed in the U.S. Patent and Trademark Office on even date herewith and which is incorporated by reference herein. In that system the liquid-flux mixture passes through flux filters and heat exchangers to cool the mixture to precipitate out and remove the flux therefrom.

However, once the flux filtration has been accomplished the temperature of the heat transfer liquid is about 70° F. The liquid cannot be directly fed back into the liquid reservoir of the condensation soldering facility which is boiling at 419° F. for such mixing would result in turbulence and rapid lowering of the temperature of the mixture. Such turbulence and lowering of the temperature of the reservoir liquid can alter the level of the vapor-air interface and possibly cause the body of hot saturated vapor to collapse. Accordingly, the cooled liquid must be heated to an elevated temperature of about 400° F. before being reintroduced into the reservoir of the condensation soldering facility. Furthermore, the liquid is very expensive and it is desirable that any evaporation thereof during heating be minimized.

Accordingly, there is a need for an energy efficient heating means to elevate the temperature of a heat transfer liquid while precluding loss of vapor thereof to the atmosphere.

SUMMARY OF THE INVENTION

The foregoing problems have been overcome by the instant method of elevating the temperature of a liquid, comprising the steps of: directing the liquid through a coil mounted in the upper portion of an enclosed chamber, condensing a hot vapor on said coil to transfer its latent heat of vaporization thereto to heat the coil and the liquid passing therethrough; passing the heated liquid from the coil to a reservoir in the lower portion of the chamber; heating the liquid in the reservoir to: (1) elevate the temperature thereof; and (2) form said hot vapor from a portion thereof; and discharging the heated liquid from the chamber.

DETAILED DESCRIPTION

The instant heating apparatus is disclosed in association with a flux filtration system used with a condensation soldering facility. However, such description is for purposes of exposition and not for limitation, for the instant heating technique may be used in various systems where a liquid is required to be efficiently preheated without evaporation losses.

FLUX FILTRATION SYSTEM

Figure 1:
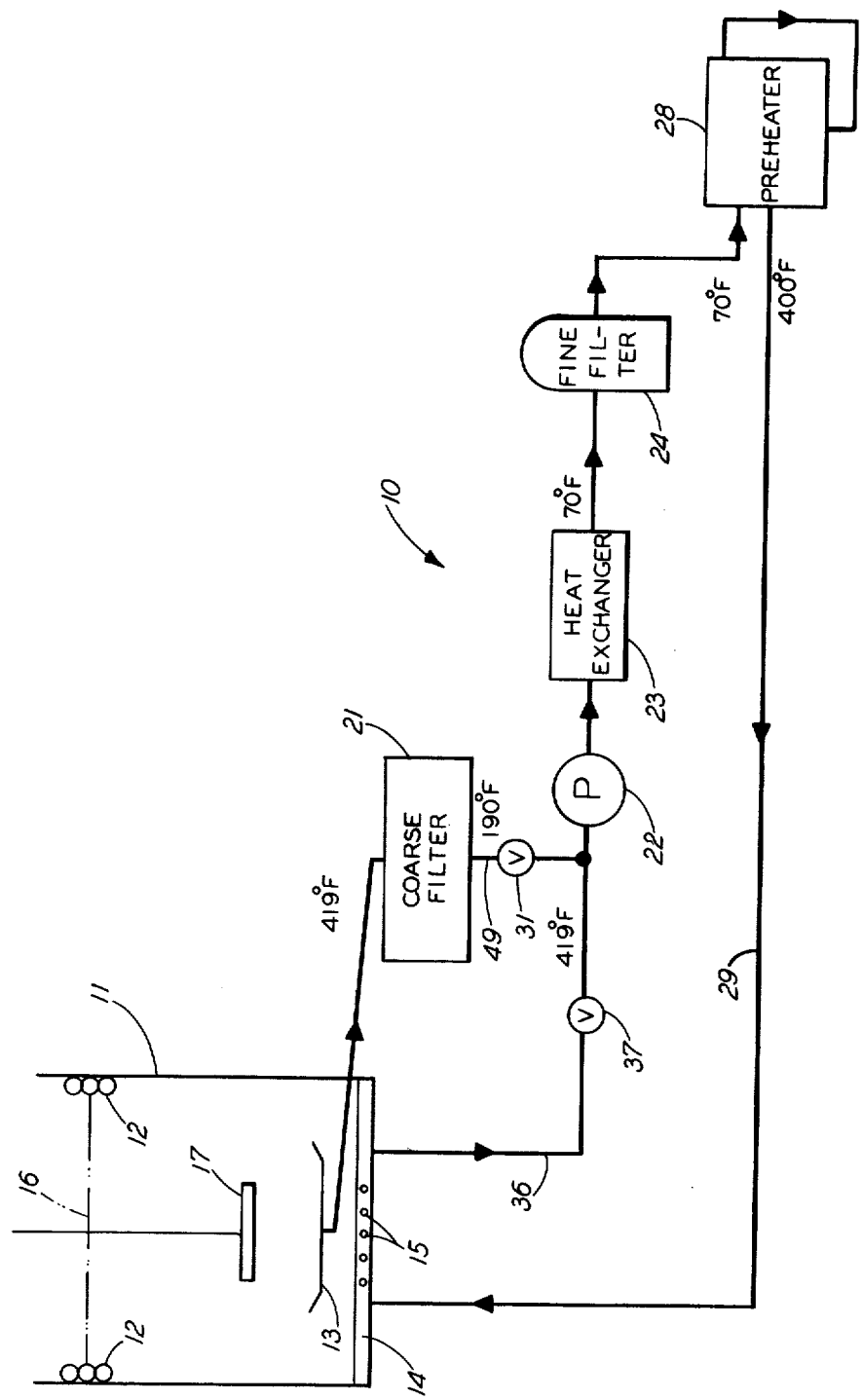
FIG. 1 depicts a flux filtration system which incorporates the instant preheating technique.

The continuous rosin flux filtration system in which the instant heating technique is implemented is generally designated by the numeral 10 in FIG. 1. The filtration system 10 is described in the aforementioned copending patent application. A condensation soldering facility 11 shown schematically in FIG. 1 is described in detail in U.S. Pat. No. Re. 30,399. The facility 11 has a cooling coil 12, a condensate drain pan 13 and a reservoir of heat transfer liquid 14 in the lower portion thereof with immersion heaters 15—15 therein.

In operation, the heaters 15—15 are activated to boil the heat transfer liquid 14 (e.g., Fluorinert FC-70) and form a body of hot (e.g., 419° F.) saturated vapor between a phantom line 16 through the cooling coil 12 and the surface of the liquid. An article 17 having solder preforms, solder paste or the like and rosin flux thereon is immersed in the body of vapor which condenses on the solder and the article causing the solder to reflow. The article 17 is then removed from the facility 11 and the solder solidifies to bond portions of the article together. During the solder reflow process, condensed vapor (i.e., heat transfer liquid) as well as rosin flux will drip from the article 17 and fall into the drain pan 13. As hereinbefore indicated, rosin flux has been found to be deleterious to the condensation soldering process. Thus, it is most desirable to filter out the flux from the heat transfer liquid 14.

The liquid-flux mixture falling from the article 17 passes through the tandem combination of a coarse filter 21, a pump 22, a water cooled heat exchanger 23, a fine mechanical filter 24, and the instant preheater 28 having an output 29 that discharges preheated, filtered heat transfer liquid 14 back into the reservoir of the facility 11.

The coarse filter 21 removes substantial portions of the rosin flux in the hot liquid-flux mixture. The filter 21 is described in detail in copending patent application Ser. No. 278,150 titled "Flux Filter" by R. C. Carlson and E. J. March, filed in the U.S. Patent and Trademark Office on even date herewith. After the filtering operation, the valve 31 is opened and the liquid is forwarded to the heat exchanger 23 by the pump 22 where the liquid is cooled to approximately 70° F. to precipitate out any rosin flux that remains in solution with the heat transfer liquid. The liquid with precipitate therein is then discharged to the fine mechanical filter 24 which will remove substantially all of the remaining particulate residue and dirt in the liquid.

The filtered heat transfer liquid 14 leaving the fine mechanical filter 24 is at a temperature of about 70° F. As hereinbefore indicated the liquid 14 cannot be directly fed back into the reservoir of the facility 11 for the mixing with the liquid 14 therein, at 419° F., would result in turbulence and lowering of the temperature of the mixture. Such turbulence and lowering of the temperature can alter the level of the vapor-air interface and possibly cause the body of vapor to collapse. Accordingly, the heat transfer liquid 14 is directed into the preheater 28 where the liquid temperature is raised to approximately 400° F. prior to being fed back into the reservoir of the facility 11 via output line 29.

Additionally, a conduit 36 carrying liquid 14, having relatively low amounts of flux contamination, communicates between the bottom of the facility 11 and the input of the pump 22 via valve 37. In operation, valve 37 is open while the valve 31 is closed (that is while the filter 21 is being filled during a plurality of batch soldering cycles) and the valve 37 is closed while the valve 31 is open. Accordingly, the heat transfer liquid 14 will continuously be flowing through the system purging the system lines and components of rosin flux which may have passed through the coarse filter 21.

PREHEATER

Figure 2:
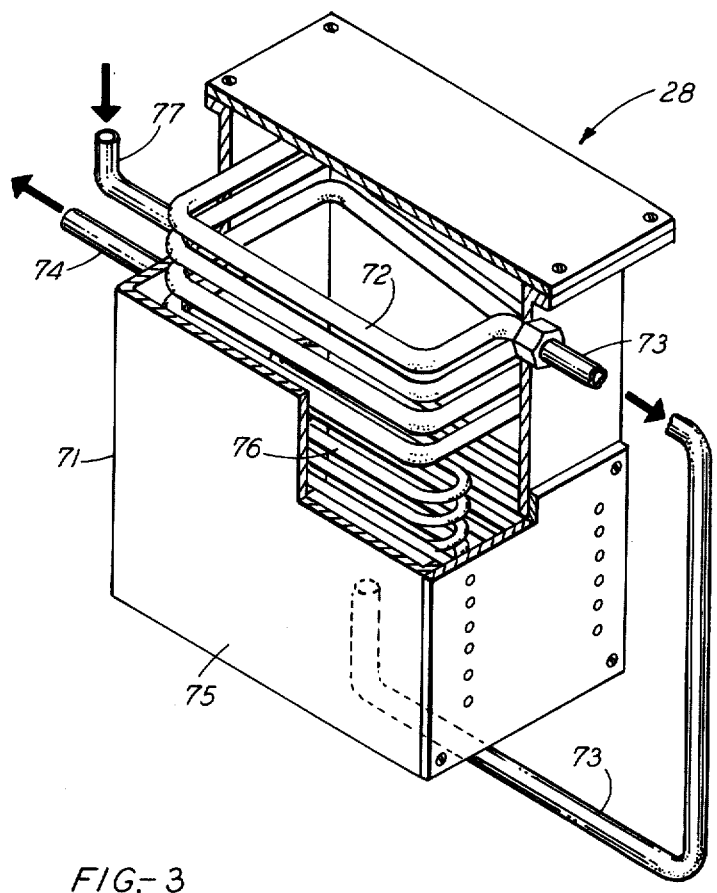
FIG. 2 is a partial cross-sectional isometric view of an exemplary preheater embodying the inventive technique.
Figure 3:
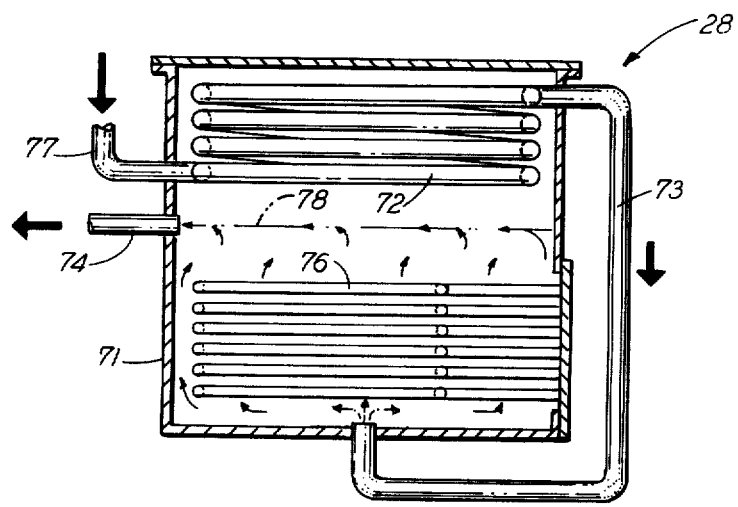
FIG. 3 is a cross-sectional view of the exemplary preheater shown in FIG. 2.

The preheater 28, shown in an isometric view in FIG. 2 is comprised of an enclosed chamber 71 having coils 72 located in the upper portion thereof. The coils 72 communicate with a liquid reservoir with the bottom of the chamber 71 via conduit 73 as can best be seen in the cross-sectional view of FIG. 3. An outlet pipe 74 is located in a sidewall 75 of the chamber 71, intermediate the coils 72 and a plurality of heating elements 76—76 located in the bottom portion of the chamber.

In operation, the filtered heat transfer liquid 14, at about 70° F., enters the coils 72 from the input line 77, travels through the coils, conduit 73, and into the bottom of the chamber 71. The heat transfer liquid 14 is then heated by elements 76—76 to 400° F. and leaves the chamber 71 through the outlet pipe 74.

As the liquid 14 is being heated, a portion thereof, unavoidably, will boil and vaporize, tending to raise the pressure within the enclosed chamber 71. In particular, pressure will build up when the liquid level is higher than the outlet pipe 74 due to a blockage or restricted flow therein. However, the pressure will be reduced due to condensation of the vapor on the coils 72 which are much cooler (e.g., initially 70° F.) than the vapor. Furthermore, such condensation of the hot vapor will cause the liquid 14 in the coils 72 to be preheated to a temperature of about 200° F. prior to flowing into the bottom of the chamber 71. Such preheating lowers the amount of energy used by the heating elements 76-76 to raise the temperature of the liquid 14 to 400° F.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A method of elevating the temperature of a low temperature liquid, comprising the steps of:
   directing the low temperature liquid through coils mounted in the upper portion of an enclosed chamber;
   passing the liquid from the coils to a reservoir in the lower part of the chamber;
   heating the liquid, in the reservoir, to the elevated temperature, proximate its boiling point, which forms a vapor thereof in the upper portion of the chamber; and
   condensing the vapor on the coils to transfer the latent heat of vaporization thereof to the coils to preheat the liquid while simultaneously lowering the pressure within the chamber; and
   discharging the heated liquid from the chamber.

2. An apparatus for elevating the temperature of a liquid, comprising:
   a chamber, closed to the atmosphere, having a base, at least one sidewall and a coverplate;
   a coil, mounted on the inside periphery of the upper portion of the chamber, having an input end to receive said liquid and an output end to discharge said liquid therefrom;
   a conduit communicating between the output end of the coil and the lower portion of the chamber;
   a heating element located in the bottom portion of the chamber to heat the liquid passing from said conduit to an elevated temperature proximate its boiling point to form a vapor which condenses on the coil to preheat the liquid therein; and
   an output port, located in the wall, intermediate the coil and the heating element, through which the heated liquid is discharged.

* * * * *